Dec. 22, 1931.   S. L. VAN METER, JR   1,837,242
BATTERY ELECTROLYTE FEEDING DEVICE
Filed Feb. 11, 1928
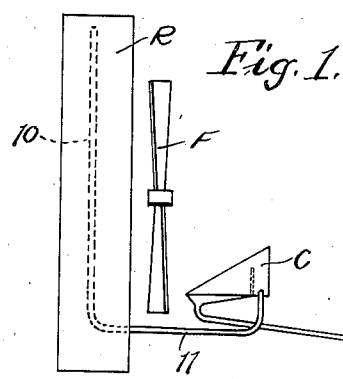
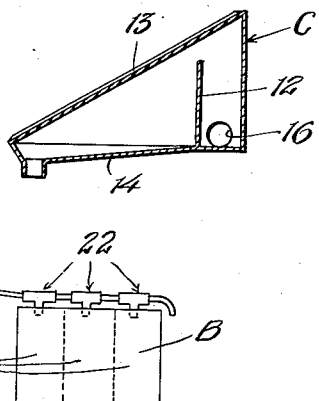
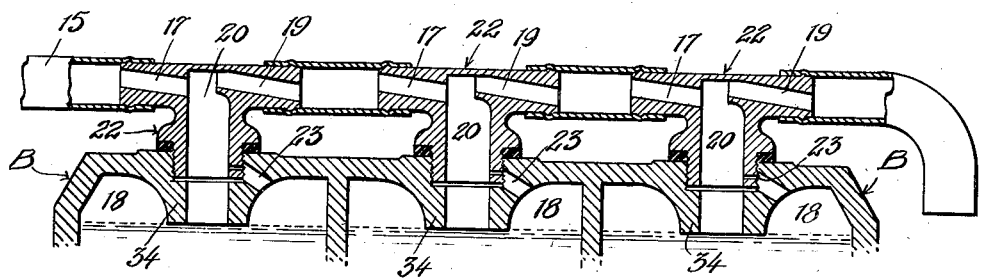
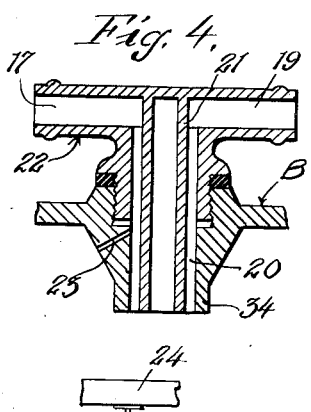
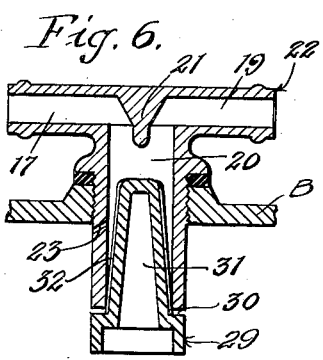
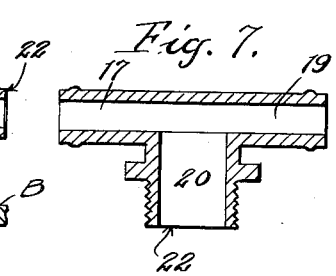
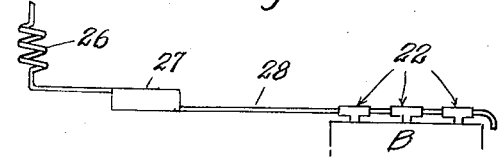
INVENTOR.
SOLOMON L. VAN METER JR.
BY
ATTORNEYS.

Patented Dec. 22, 1931

1,837,242

UNITED STATES PATENT OFFICE

SOLOMON L. VAN METER, JR., OF GARDEN CITY, NEW YORK

BATTERY ELECTROLYTE FEEDING DEVICE

Application filed February 11, 1928. Serial No. 253,736.

My invention relates to a battery electrolyte feeding device.

The extensive use of storage batteries in automotive vehicles for the starting, lighting, and ignition systems, thereof, and the consequent necessity for entrusting the servicing of such batteries to owners unskilled in their care or use, has frequently resulted in injury thereto thru failure to replenish the liquid losses constantly occurring in the battery cell or cells. The necessity of maintaining a sufficiently high level of electrolyte within the battery cell or cells is well known. Any lowering of the electrolyte beyond a predetermined level lessens the operating efficiency of the battery, while a continued drop in the level of the electrolyte will eventually so injure the battery as to render it totally unserviceable. The evaporation of the electrolyte in the battery cell or cells is gradual tho constant and to replenish this loss it has been the practice heretofore to add, from time to time, a quantity of distilled water. So long as the volume of electrolyte is held substantially constant, no injury to the battery occurs. Unfortunately, however, due to the inaccessible location of batteries in automotive vehicles, and to a frequent tendency of owners to refrain from performing a tedious and disagreeable task, the servicing of the battery is either indefinitely deferred or altogether neglected.

The principal object of the present invention is to provide a battery service system by means of which the battery cell or cells are automatically replenished with an amount of liquid (usually distilled water) equal to the losses occurring within the battery thru evaporation, thereby maintaining, under all operating conditions, a substantially constant specific gravity and volume of electrolyte within the battery.

A further object of the invention is to provide a battery service system in which either the evaporation occurring in the cooling system of an automotive vehicle power plant or the condensed and filtered water obtained from the exhaust conduit thereof, is relied upon to furnish the liquid necessary to the replenishment or servicing of the battery.

A still further object of the invention is to provide a battery service system in which all liquid, over and above the replenishment demands of the battery, originating within or entering the system, is automatically carried off as excess when and after the liquid within the battery is brought to the proper level.

Other and further objects and advantages of the invention will be hereinafter disclosed.

In the drawings, wherein like reference characters denote like or corresponding parts, Fig. 1 is a diagrammatic illustration of the preferred embodiment of the invention;

Fig. 2 is a transverse vertical sectional view of the condenser;

Fig. 3 is a transverse vertical sectional view of a part of a multiple cell battery showing the connections leading respectively thereto and therefrom;

Fig. 4 is a sectional view illustrating a modified form of cell plug;

Fig. 5 is a diagrammatic illustration of a modified embodiment of the invention;

Fig. 6 is a sectional view of a further plug modification, and

Fig. 7 is a sectional view of a further modification in which the filler plug is reduced to its simplest form.

In Fig. 1 of the drawings a multiple cell battery is indicated at B, a suitable condenser is indicated at C, and a radiator such as is commonly used in connection with the cooling system of an automotive vehicle power plant is indicated at R. From the vent tube 10 of the radiator R, a pipe 11 is carried to the condenser C. The condenser C (see Fig. 2) is preferably of right triangular section (any suitable type condenser can be used) and is provided on its interior with an up-standing baffle 12. The vapor resulting from the evaporation of the cooling medium within the radiator R is conveyed to the condenser C by the pipe connection 11. From the discharge end of the pipe 11 at one side of the baffle 12, the vapor rises within the condenser and is therein condensed by contact with the top inclined wall 13 thereof. This inclined wall 13 is preferably formed of copper or some other noncorrosive or rust-proof material and may or may not be disposed in the direct path of the air stream created by the fan indicated at F, (Fig. 1) usually associated with the radiator of the power plant. The condensation occurring within the condenser C is fed by gravity along the surface or wall 13 toward the bottom of the condenser, which bottom, (see Fig. 2) is sloping or substantially funnel-shaped as indicated at 14. By means of a pipe 15 the condensation (distilled water) is fed to the battery B. To take care of an abnormal condition such as might very readily occur should the cooling medium within the radiator begin to boil, a discharge opening 16 is provided within the condenser for the escape of the resulting steam. Such escape, however, would in no way impair the operating efficiency of the system since the transverse dimension of the condenser can be so proportioned as to provide for a condensation supply in excess of the replenishment demands of the battery under all circumstances.

At the discharge end of the pipe 15 a battery refilling device or system of the same general character as that described in my co-pending applications Serial #78,072 filed December 29, 1925 (now Patent No. 1,791,152, granted Feb. 3, 1931) and Serial #92,741 filed March 6, 1926, is provided. From said discharge pipe the filling liquid is fed successively thru filler ducts 17 to the separate battery cells 18, all excess being carried off and away from each battery cell by means of over-flow ducts 19. The filler ducts 17, in conjunction with the over-flow ducts 19, extend transversely across the total number of battery cells. Leading off from each filler duct, one into each cell 18 of the battery, are filler passages 20. These passages 20 are carried into the respective cells and discharge thereinto at a point at least as low as the proper level of the electrolyte. Each filler duct 17 at its point of juncture with its associated filler passage 20 is so formed as to admit of the unobstructed flow of the filling liquid thereinto. This may be accomplished economically in any of several ways, to wit: by providing a break in the continuity of each filler duct thru an offset therein at its point of juncture with its communicating filler passage 20 (see Fig. 3); by extending into the filler passages at each said point of juncture a deflecting tube or nipple 21 (see Fig. 6); or, reduced to its simplest form (see Fig. 7), by merely so forming the filler ducts 17 and the filler passages 20 as to admit of the unobstructed flow from one to the other.

For convenience in assembly, the refilling device is preferably made sectional, the number of sections corresponding with the number of cells, and each section being in effect a plug 22, threaded, if desired, one plug into each cell of the battery. That the gases originating within the battery may be carried off by way of the over-flow ducts 19, each cell 18 of the battery is vented as at 23. The vents 23, in each instance, are open to one or the other of ducts 17 or 19 or to the passages 20 and are made small enough to insure the sealing thereof by capillarity sufficiently to retain within each cell, during a filling operation, enough gas to prevent the battery cells from being completely filled with liquid.

In the modification of Fig. 5, the condensation of the water carried off with the products of combustion emanating from the power plant is utilized as a source of liquid supply instead of the vapor originating in the cooling system. Where such utilization is made, the exhaust conduit 24 of the power plane is tapped as at 25 and the condensation conveyed through a coil condenser 26 to a suitable filter 27. From the filter, after purification, the condensation is conveyed to the battery B by means of pipe connection 28.

A battery service system characterized as herein set forth is especially useful as an automobile or other automotive vehicle accessory. By utilizing the condensation of either the vapor originating in the cooling system or the condensation emanating from the exhaust, an adequate liquid (distilled water) supply is at all times available to more than compensate for and replenish the losses occurring within the battery due to evaporation or to any other cause. The refilling or replenishing of the battery is not only entirely automatic but is, at the same time, almost directly proportional to its requirements. In warm weather, or on long trips, when evaporation within the battery is comparatively rapid, a similar condition exists with respect to the evaporation occurring within the radiator. Conversely in cold weather a slow evaporation within the battery is counteracted by a correspondingly slow evaporation within the radiator. Moreover, since only the required amount of replenishing liquid is directed into the battery cell or cells, any untoward accumulation of condensation, regardless of its origin, will be merely carried off and discharged as excess. Under no circumstances is it possible to over-service or under-service the battery.

In the modification of Fig. 6 a float 29 is indicated. This float is provided with an annular shoulder 30 and with a hollow extension 31. The extension 31 is carried vertically within the filler passage 32 of the filler plug and is centered therein by means of vertical ridges or beads 32 formed on its outer surface. In batteries used on aircraft a float thus characterized is helpful. Normally it occupies a position with the shoulder 30 thereof in engagement with the bottom end of the filler passage. Its buoyancy, with the electrolyte kept at the proper level, acts to hold it in this position. Should the battery, for any reason be turned upside-down, and it might very readily be so turned in aircraft, the electrolyte entering the hollow of the float (which is prevented from being displaced by its engagement with the battery plates) will cause it (the float) to act as a stopper and close said filler passage and accordingly prevent the loss of electrolyte thru gravity flow by way of the overflow duct.

Where plugs are provided as herein shown, each plug is separately removable. Preferably the plugs are threaded into the battery as indicated. The plug extensions within which the filler passages are formed may be carried into the battery cells to a point at least as low as the proper electrolyte level (see Fig. 6) or, as shown in Figs. 3 and 4, said extensions may terminate short of said level and the passages carried beyond the ends thereof by providing on the inside of each cell, in vertical alignment with said extensions, annular flanges or cell extensions 34. In venting the cells in a manner such that the vents 23 thereof are sealed by capillarity during a filling operation, the rise of the electrolyte within the cells substantially above the bottom end of the filler passages is prevented by the retention of a certain amount of air and gas within and at the top of each cell. The manner in which the cells are successively filled by the overflow method until each is filled to its proper level is obvious. This particular phase of the invention is fully set forth in the previously mentioned co-pending applications.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a battery service system, a filler plug connection having formed therein a filler duct, an overflow duct, and a filler passage open at one end to said filler duct and to said overflow duct and open at its opposite end to the electrolyte battery chamber, said chamber being vented at a point above the lower end of said filler passage, said vent being open at its opposite end to said plug and being of such size as to admit of a sufficient sealing thereof by capillarity to prevent said chamber being filled with liquid during a filling operation, and a source of liquid supply in communication with said filler duct, the liquid supply in its passage thru said plug being adapted to effect said seal.

2. In a battery service system, a filler plug connection having formed therein a filler duct, an overflow duct, a filler passage, and a vent of capillary proportions; said filler passage being open to said filler duct and to said overflow duct and being carried at one end into the battery electrolyte chamber to a point of discharge at approximately the normal proper level of the electrolyte, and said vent being open at one end to said chamber and at its opposite end to said filler passage whereby, in a filling operation, it is effectually sealed by the filling liquid within said filler passage.

3. In a battery service system, a filler passage carried at one end within the battery electrolyte chamber to a point at substantially the normal proper level of the electrolyte, said passage having formed therein a vent of capillary proportions open at its opposite end to said chamber, and which said vent, during a filling operation, is adapted to be sealed by the filling liquid within the filler passage to automatically shut off the liquid supply to said chamber when and as said proper liquid level within said chamber is reached.

4. In a battery service system, a filler passage carried at one end within the battery electrolyte chamber to a point of discharge at substantially the normal proper level of the electrolyte, said passage having formed therein a vent of capillary proportions open at its opposite end to said chamber, which said vent, during a filling operation, is adapted to be sealed by the filling liquid within said filler passage to automatically shut off the liquid supply to said chamber when and as the level of the electrolyte within said chamber shall have reached the discharge end of said filler passage.

5. In a battery service system, a filler passage terminating at one end within the battery electrolyte chamber, said filler passage having formed therein a vent of capillary proportions open at its opposite end to said chamber, which said vent, during a filling operation, is adapted to be sealed by the filling liquid within said filler passage to automatically shut off the liquid supply to said chamber.

In testimony whereof I hereunto affix my signature.

SOLOMON L. VAN METER, Jr.